US012572284B2

(12) United States Patent
Takemoto et al.

(10) Patent No.: US 12,572,284 B2
(45) Date of Patent: Mar. 10, 2026

(54) MEMORY SYSTEM

(71) Applicant: KIOXIA CORPORATION, Tokyo (JP)

(72) Inventors: Takashi Takemoto, Yokohama Kanagawa (JP); Kensaku Yamaguchi, Kawasaki Kanagawa (JP)

(73) Assignee: Kioxia Corporation, Tokyo (JP)

( * ) Notice: Subject to any disclaimer, the term of this patent is extended or adjusted under 35 U.S.C. 154(b) by 439 days.

(21) Appl. No.: 17/899,398

(22) Filed: Aug. 30, 2022

(65) Prior Publication Data

US 2023/0305718 A1     Sep. 28, 2023

(30) Foreign Application Priority Data

Mar. 22, 2022     (JP) ................................. 2022-046002

(51) Int. Cl.
*G06F 3/06* (2006.01)

(52) U.S. Cl.
CPC .......... *G06F 3/0623* (2013.01); *G06F 3/0658* (2013.01); *G06F 3/0679* (2013.01)

(58) Field of Classification Search
CPC ..... G06F 3/0623; G06F 3/0658; G06F 3/0679
See application file for complete search history.

(56) References Cited

U.S. PATENT DOCUMENTS

| | | | |
|---|---|---|---|
| 9,148,172 | B2 | 9/2015 | Manning et al. |
| 9,176,808 | B2 | 11/2015 | Shim et al. |
| 9,274,706 | B2 | 3/2016 | Yeh et al. |
| 10,481,797 | B2 | 11/2019 | Hahn et al. |
| 10,572,340 | B2 | 2/2020 | Zhou |
| 2013/0007346 | A1* | 1/2013 | Khan .................. H03M 7/3071 |
| | | | 711/E12.008 |
| 2013/0290482 | A1* | 10/2013 | Leggette ................. H04L 69/40 |
| | | | 709/217 |
| 2013/0326170 | A1* | 12/2013 | Kilari ..................... G06F 12/08 |
| | | | 711/161 |
| 2018/0267746 | A1 | 9/2018 | Itoh et al. |
| 2019/0065788 | A1* | 2/2019 | Vijayasankar .......... G06F 3/064 |
| 2021/0334160 | A1* | 10/2021 | Mishra ................ H03M 13/154 |

FOREIGN PATENT DOCUMENTS

JP          2018-156137 A     10/2018

* cited by examiner

*Primary Examiner* — Prasith Thammavong
(74) *Attorney, Agent, or Firm* — Kim & Stewart LLP

(57) ABSTRACT

A memory system includes a nonvolatile memory and a controller. The controller is configured to segment data into clusters, perform a compression with respect to each of the clusters, allocate the clusters subjected to the compression to encoding frames in accordance with a predetermined rule. According to the predetermined rule, at least a part of a cluster is allocated to a vacant space of an encoding frame in a first state, when a predetermined condition is met, and an entirety of a cluster is allocated to an encoding frame in a second state, when no encoding frame in the first state exists or when the predetermined condition is not met. The controller is further configured to encode data in each of the encoding frames and write the encoded data into the nonvolatile memory.

10 Claims, 6 Drawing Sheets

FIG. 2

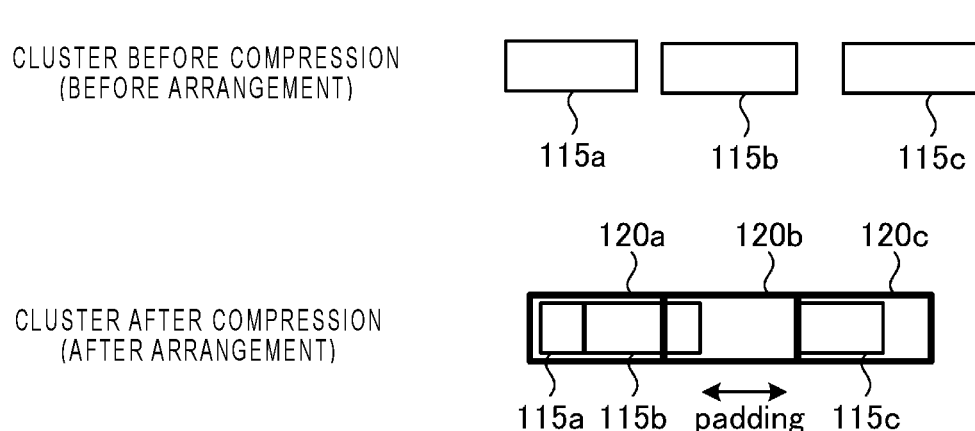

CLUSTER BEFORE COMPRESSION
(BEFORE ARRANGEMENT)

115a    115b    115c

CLUSTER AFTER COMPRESSION
(AFTER ARRANGEMENT)

120a   120b   120c 115a 115b   padding   115c

FIG. 3

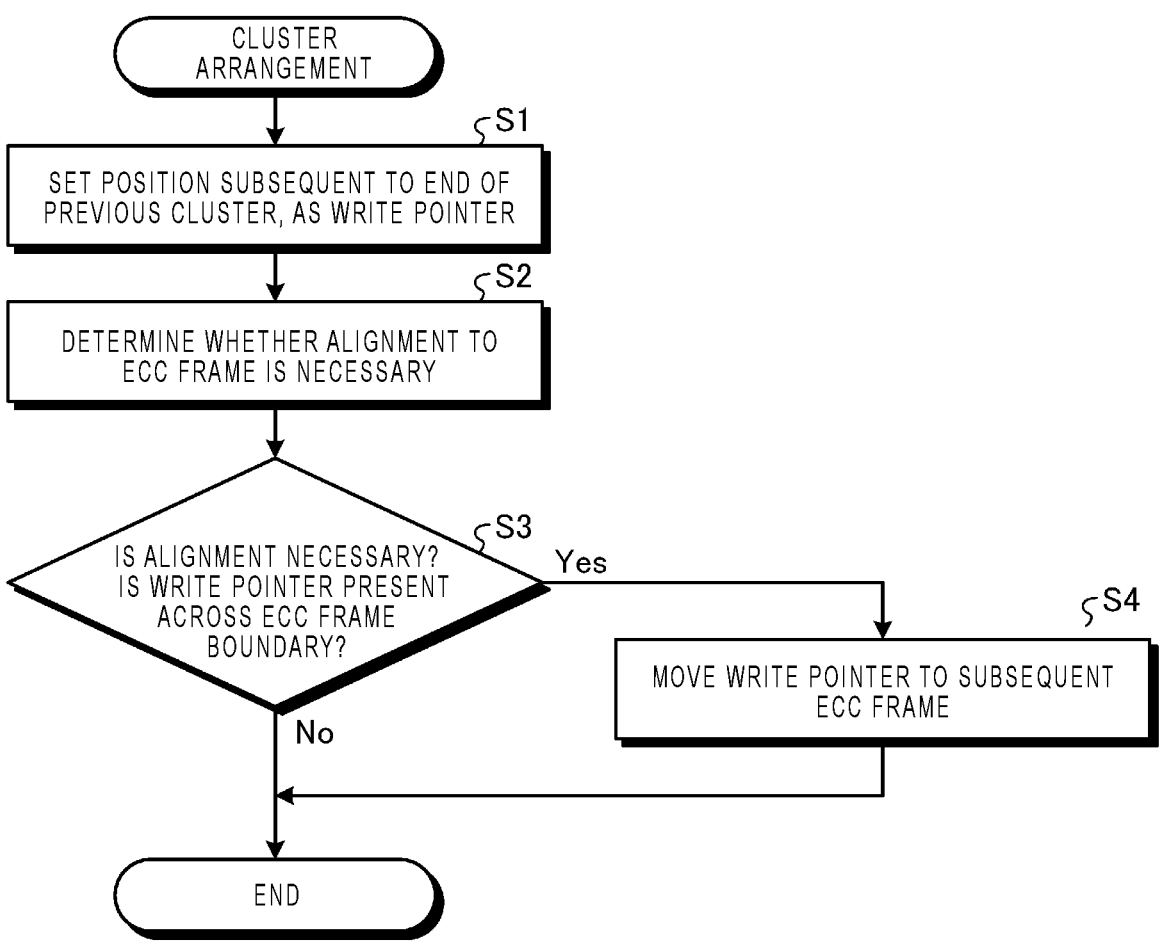

CLUSTER
ARRANGEMENT

S1

SET POSITION SUBSEQUENT TO END OF
PREVIOUS CLUSTER, AS WRITE POINTER

S2

DETERMINE WHETHER ALIGNMENT TO
ECC FRAME IS NECESSARY

S3

IS ALIGNMENT NECESSARY?
IS WRITE POINTER PRESENT
ACROSS ECC FRAME
BOUNDARY?

Yes

No

S4

MOVE WRITE POINTER TO SUBSEQUENT
ECC FRAME

END

MEMORY SYSTEM

CROSS-REFERENCE TO RELATED APPLICATION(S)

This application is based upon and claims the benefit of priority from Japanese Patent Application No. 2022-046002, filed Mar. 22, 2022, the entire contents of which are incorporated herein by reference.

FIELD

Embodiments described herein relate generally to a memory system.

BACKGROUND

There is a memory system that has a function of compressing and decompressing user data with a NAND controller. The user data to be written are divided into data having a predetermined size (hereinafter, such data may also be referred to as a "cluster"). Further, the memory system compresses the cluster, and writes the compressed cluster into a nonvolatile memory. In this case, it is desirable for the memory system to efficiently read the compressed cluster.

BRIEF DESCRIPTION OF THE DRAWINGS

FIG. 2 is a diagram illustrating an example of cluster arrangement according to the first embodiment.

FIG. 3 is a flowchart illustrating a procedure for a cluster arrangement process performed by the memory system according to the first embodiment.

FIGS. 6A, 6B, and 6C are diagrams illustrating an example of cluster arrangement according to a third embodiment.

DETAILED DESCRIPTION

Embodiments provide a memory system which performs a control to efficiently read a compressed cluster.

In general, according to an embodiment, a memory system includes a nonvolatile memory and a controller. The controller is configured to segment data to be stored in the nonvolatile memory into a plurality of clusters, perform a compression with respect to each of the clusters, allocate the clusters subjected to the compression to a plurality of encoding frames in accordance with a first predetermined rule. According to the first predetermined rule, at least a part of a cluster is allocated to a vacant space of an encoding frame in a first state, which is an encoding frame to which another cluster has been allocated, when a logical address or a size of the cluster subjected to the compression satisfies a predetermined condition, and an entirety of a cluster is allocated to an encoding frame in a second state, which is an encoding frame to which no other cluster has been allocated, when no encoding frame in the first state exists or when the logical address or the size of the cluster subjected to the compression does not satisfy the predetermined condition. The controller is further configured to encode data in each of the encoding frames and write the encoded data into the nonvolatile memory.

Hereinafter, a memory system according to embodiments will be described in detail with reference to the accompanying drawings. The present disclosure is not limited to the embodiments.

First Embodiment

Figure 1:
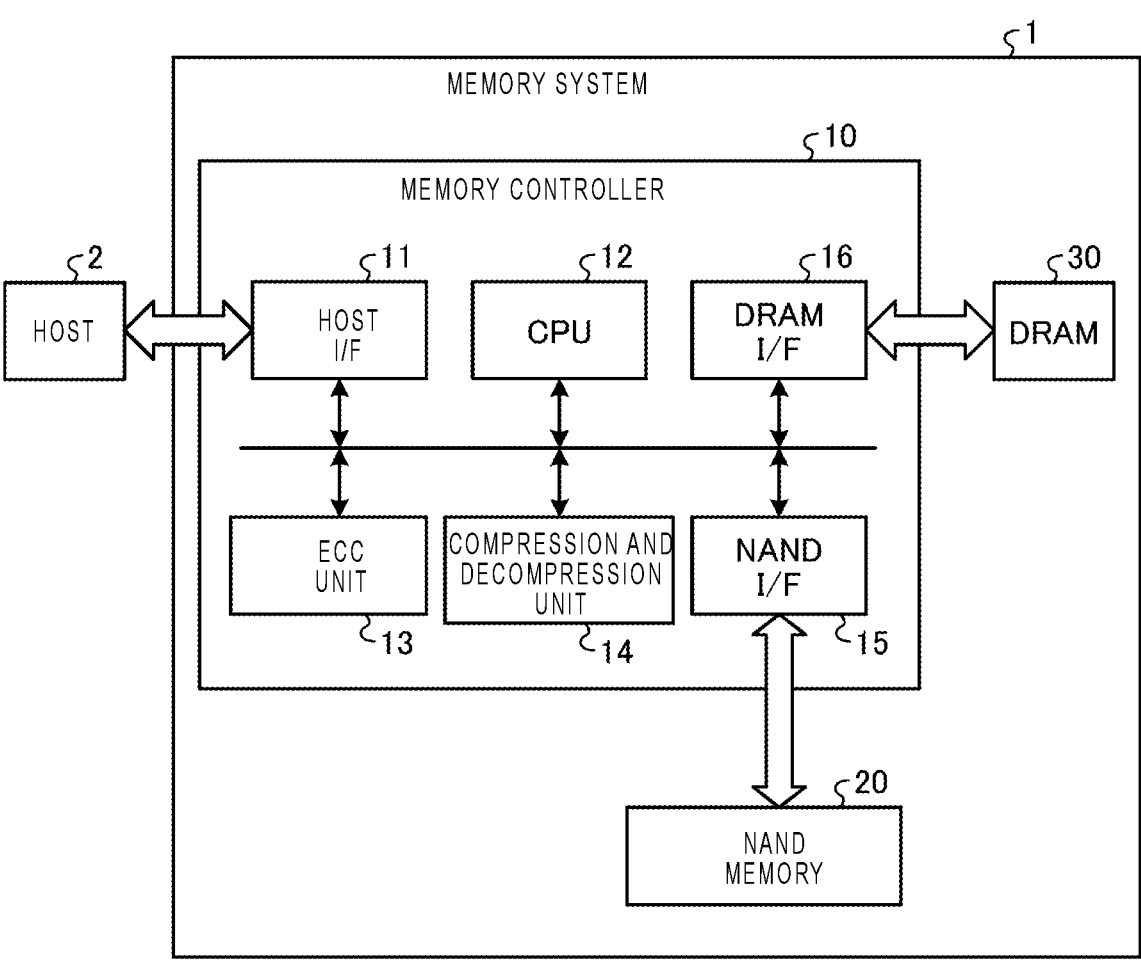
FIG. 1 is a block diagram illustrating an example of a configuration of a memory system according to a first embodiment.

FIG. 1 is a block diagram illustrating an example of a configuration of a memory system 1 according to a first embodiment. As illustrated in FIG. 1, the memory system 1 includes a memory controller 10, a NAND flash memory 20 (hereinafter, referred to as a "NAND memory 20"), and a DRAM 30. The memory system 1 may be a memory card or the like in which the memory controller 10 and the NAND memory 20 are configured as one package, or may be an SSD (solid state drive) or the like.

The memory controller 10 may be configured as, for example, an SoC (system on a chip). Further, the memory controller 10 may include an FPGA (field programmable gate array) or an ASIC (application specific integrated circuit). The memory controller 10 may instruct the NAND memory 20 to execute various operations. The memory controller 10 executes an operation based on a request from an external host 2, and an operation that does not depend on a request from the host 2. Each function of the memory controller 10 may be implemented by a CPU (central processing unit) that executes programs, or may be implemented by dedicated hardware.

The memory controller 10 includes a host interface (I/F) 11, a CPU 12, an ECC unit 13, a compression and decompression unit 14, a NAND interface (I/F) 15, and a DRAM interface (I/F) 16.

The host I/F 11 is connected to the host 2, and takes in charge of a communication between the memory system 1 and the host 2. The host I/F 11 controls transfer of data, requests, and addresses, for example, between the memory system 1 and the host 2. The host I/F 11 executes a process according to a communication interface standard with respect to the host 2. The host I/F 11 receives signals representing an address and a command of an access destination received from the host 2. Further, the host I/F 11 receives user data to be written from the host 2.

The CPU 12 controls operations of the entire memory controller 10. The CPU 12 issues, for example, a write command in response to a write request received from the host 2, and transmits the issued write command to the NAND I/F 15. Further, the CPU 12 issues a read command in response to a read request received from the host 2, and transmits the issued read command to the NAND I/F 15. The control of data read or data write with respect to the NAND memory 20 is performed in units of a physical page. The physical page includes a predetermined number of multiple memory cells. The size of the physical page is, for example, 4 Kbytes, 8 Kbytes, 16 Kbytes, and the like.

When a write command specifying a logical address and user data corresponding to the logical address is received, the CPU 12 divides the user data received from the host 2 into clusters each having a certain size. Here, a cluster is data having a unit size of management by the memory controller 10. In an example, the management refers to a management of associating a logical address and a physical address with each other. The unit size of the management is, for example, 4 Kbytes, but is not limited thereto. Further, the cluster may also be a unit of a compression process.

The CPU 12 causes the compression and decompression unit 14 to execute the compression process with respect to each cluster. Then, the CPU 12 causes the ECC unit 13 to encode the compressed clusters for each ECC (error correcting code) frame. The ECC frame is the unit of an error correction encoding process. The size of an uncompressed cluster has a fixed length, and the ECC frame corresponds to the size of the uncompressed cluster. Meanwhile, the CPU 12 converts a logical address of the corresponding cluster into an arrangement address (e.g., physical address) of the NAND memory 20. For example, the CPU 12 determines the arrangement address based on the ECC frame. Further, the CPU 12 writes data of the ECC frame to the NAND memory 20 based on the arrangement address.

Further, the CPU 12 executes a garbage collection (i.e., compaction) process. Specifically, when a writable physical block is insufficient in the NAND memory 20, in which an additional write process is not possible, the CPU 12 saves and erases valid data from a written block, and newly generates a writable block. The valid data saved from the block subjected to the garbage collection are written again (i.e., copied) to the writable block.

The ECC unit 13 generates a parity for the error detection and correction by encoding the user data of the ECC frame, and generates a code word including the user data and the parity. Further, the ECC unit 13 decodes the code word read from the NAND memory 20 to restore the user data. For example, the ECC unit 13 receives data in a predetermined unit from the CPU 12, encodes the received data, and generates a parity to generate a code word.

The compression and decompression unit 14 compresses the cluster. The compression and decompression unit 14 may compress the cluster, for example, in a predetermined compression format of the memory system 1. When a cluster is compressed as a result of the execution of the cluster compression process, the compression and decompression unit 14 transmits the compressed cluster to the CPU 12 after the cluster compression process. When the cluster is not compressed as a result of the execution of the cluster compression process, the compression and decompression unit 14 transmits a notification of the result to the CPU 12. Here, the case where the cluster is not compressed indicates a case where a size of the cluster is unchanged. Further, when the cluster is not compressed as a result of the execution of the cluster compression process, the compression and decompression unit 14 may transmit the uncompressed cluster to the CPU 12. Then, there are two types of clusters after the cluster compression process, which include a compressed cluster and an uncompressed cluster. Meanwhile, while the data size of the uncompressed cluster has a fixed length, the size of the cluster compressed by the compression and decompression unit 14 varies according to the data contents of the cluster and has a variable length. Further, the compression and decompression unit 14 decompresses the compressed data.

The NAND I/F 15 takes in charge of a communication with the NAND memory 20. The NAND I/F 15 is configured in accordance with a NAND interface standard.

The DRAM I/F 16 takes in charge of a communication with the DRAM 30. The DRAM I/F 16 is configured in accordance with a DRAM interface standard.

As described above, when the clusters are arranged as ECC frames without being compressed, and data corresponding to the ECC frame is written into the NAND memory 20 after the encoding, data corresponding to one ECC frame may need to be read in order to read the cluster the ECC frame. However, when the cluster is compressed and a correction code is applied thereto, the size of the compressed cluster is reduced, so that one cluster may extend over two ECC frames. This causes the following results. (1) A coding and decoding process is required for data of two adjacent ECC frames. That is, the amount of the decoding process by the ECC unit 13 is doubled. (2) Data corresponding to the two adjacent ECC frames need to be transferred from the NAND memory 20. That is, the amount of the transfer by the NAND memory 20 is doubled. Thus, when a cluster written to the NAND memory 20 extends over two ECC frames, the memory controller needs to transfer or decode the data in the size corresponding to the two ECC frames in order to read the corresponding cluster, and as a result, the efficiency of a read process is deteriorated. Meanwhile, even for the cluster extending over two ECC frames, a sequential read may avoid the deterioration of the efficiency by caching the data after the ECC decoding and using the cached data in an adjacent read. However, a read by a random access may need to suffer from the deterioration of the process efficiency.

To address such an issue, the memory system 1 according to the first embodiment performs a control to efficiently read the compressed cluster.

The memory controller 10 according to the first embodiment divides user data received from the host 2 into clusters, compresses each cluster, encodes each cluster in units of an ECC frame, and writes the encoded data to the NAND memory 20.

The memory controller 10 according to the first embodiment determines an ECC frame in which a cluster after the compression process is to be arranged, according to a predetermined condition.

Here, an example of the arrangement of a compressed cluster in an ECC frame will be described with reference to FIG. 2. As illustrated in FIG. 2, it is assumed that there are clusters 115a to 115c before the compression. The clusters 115a to 115c before the compression have the same size. Hereinafter, when the clusters 115a, 115b, . . . , and 115n do not need to be discriminated from each other, the clusters 115a to 115c will be referred to as the cluster 115.

The compression and decompression unit 14 compresses the clusters 115a to 115c. When the clusters 115a to 115c are compressed, the sizes of the clusters 115a to 115c become smaller than those in the uncompressed state, and thus, do not correspond to the size of ECC frames.

The CPU 12 arranges the compressed cluster 115a and a part of the compressed cluster 115b as an ECC frame 120a. Further, the CPU 12 arranges the rest of the compressed cluster 115b as an ECC frame 120b. Then, when the size of the remaining area of the ECC frame 120b (hereinafter, also referred to as a "padding") is equal to or less than a predetermined threshold value, the CPU 12 sets the arrangement position of the compressed cluster 115c to correspond to an ECC frame 120c. Meanwhile, a value (e.g., 0) defined in advance is written to the padding area. In this way, the adjustment process executed by the CPU 12 to align the arrangement position of the cluster 115 with the head position of the ECC frame 120 will also be referred to as an alignment. When the alignment is performed as described above, the CPU 12 determines the arrangement address in units of the ECC frame 120 which is larger than the compressed cluster. The CPU 12 arranges the compressed cluster 115c to correspond to the subsequent ECC frame 120c, and not to the ECC frame 120b. That is, the CPU 12 changes the arrangement position of the compressed cluster 115c (hereinafter, also referred to as a "write pointer") to the head position of the ECC frame 120c. Hereinafter, when the ECC frames 120a, 120b, . . . , and 120n do not need to be discriminated from each other, the ECC frames will be referred to as the ECC frame 120.

As described above, when the size of the padding of the ECC frame 120b is equal to or less than a predetermined threshold value, the CPU 12 changes the arrangement positions of the clusters 115 to take the balance between increasing free areas and reducing the number of clusters 115 extending over ECC frames. For example, a threshold value may be set based on an allowable wasteful area, and the CPU 12 may perform the changing of the arrangement positions when a wasteful area generated according to the arrangement positions is equal to or less than the threshold value. In the example of FIG. 2, the wasteful area is generated between the cluster 115b and the cluster 115c. Since the wasteful area is generated only between a cluster that does not require the alignment and a cluster that requires the alignment are adjacent to each other, the presence of the wasteful area may be controlled by adjusting the criteria for performing the alignment. That is, it is possible to optimize the trade-off between a performance penalty caused by clusters 115 extending over ECC frames and a capacity penalty caused by the wasteful areas.

While descriptions have been made on a case where the CPU 12 refers to the remaining area of the ECC frame 120 to determine whether or not to align the write position to another ECC frame 120, the alignment may be performed based on other conditions.

For example, the CPU 12 may perform the alignment when a cluster 115 is an uncompressed cluster 115. This condition assumes that the uncompressed clusters 115 tend to be continuously generated, and once the alignment is performed with respect to one uncompressed cluster 115, the subsequent clusters 115 may be expected to be aligned.

Alternatively, the CPU 12 may perform the alignment when a logical address of a cluster 115 is discontinuous from a logical address of a previous cluster. This arrangement rule assumes that when the logical address of the cluster 115 is discontinuous from the logical address of the previous cluster, a read process with respect to the cluster 115 is highly likely to be a random access.

Subsequently, a process procedure for the cluster arrangement process executed by the CPU 12 will be described with reference to FIG. 3. FIG. 3 is a flowchart illustrating the process procedure for the cluster arrangement process performed by the memory system 1 according to the first embodiment.

The CPU 12 sets a position subsequent to an end of a previous cluster 115 arranged in an ECC frame 120 immediately before a cluster 115 to be arranged, as a write pointer (step S1). Subsequently, the CPU 12 determines whether the alignment of the cluster 115 to the subsequent ECC frame 120 is necessary (step S2). For example, the CPU 12 determines whether the alignment is necessary, based on the free area of the ECC frame 120 to which the previous cluster 115 is arranged.

When it is determined that the alignment is necessary and the write pointer is not at the boundary of the ECC frame 120 (step S3: Yes), the CPU 12 moves the write pointer to the subsequent ECC frame 120 (step S4).

The read process is performed in the reverse order to that of the write process. Specifically, the CPU 12 reads one or more ECC frames 120 including the read target cluster 115 from the NAND memory 20, decodes the read ECC frame 120 by the ECC unit 13, and stores the decoded ECC frame 120 in a buffer within the memory controller 10. When all of the read target cluster 115 are stored in the buffer, the CPU 12 transmits the read target data to the host 2 via the host I/F 11.

As described above, the memory controller 10 executes the compression process with respect to the clusters 115 that are generated based on the user data acquired from the host 2, and then, performs the conversion of logical addresses of the clusters 115 into arrangement addresses of the clusters 115. The memory controller 10 determines whether to align a cluster 115 to another ECC frame 120, with respect to each of the clusters 115. In this way, by executing the alignment for one or more clusters 115 that satisfies the predetermined condition, the memory controller 10 may reduce the number of clusters 115 extending over ECC frames 120, and may efficiently read the compressed cluster during the read process.

Further, the memory controller 10 determines whether the alignment of a cluster 115 (i.e., change of an arrangement address of the cluster 115) is necessary, based on the logical address of the cluster 115 or the size of the cluster 115 after the compression process. As a result, the memory controller 10 may determine whether the alignment is necessary in consideration of the possibility of the sequential read or the size of the free area in the ECC frame 120.

Second Embodiment

A memory system 1 according to a second embodiment sets a plurality of write pointers, switches the write pointers according to whether the cluster 115 is compressed or uncompressed. Then, the memory system 1 selects either a first arrangement process of arranging the cluster 115 in the ECC frame 120 on the head side of a layout area, or a second arrangement process of arranging the cluster 115 in the ECC frame 120 on the end side of the layout area, so as to reduce the number of clusters 115 extending over the boundary of the ECC frames 120. The size of one layout area is several hundred Kbytes. Further, the layout area may have a size which is an integral multiple of the ECC frame 120.

Figure 4:
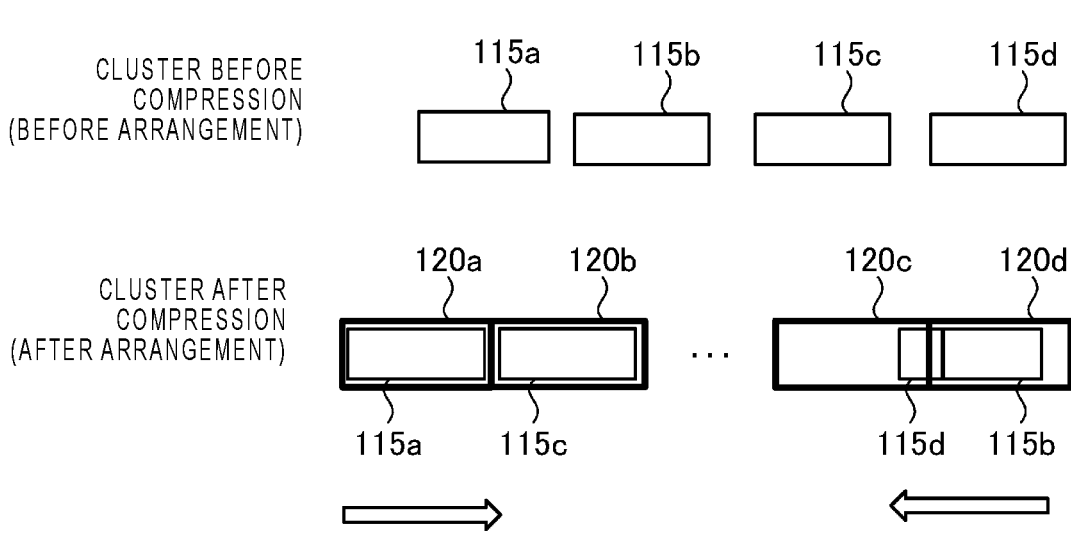
FIG. 4 is a diagram illustrating an example of cluster arrangement according to a second embodiment.

Here, descriptions will be made on an example in which clusters 115 are arranged in ECC frames 120 according to the second embodiment, with reference to FIG. 4. As illustrated in FIG. 4, it is assumed that there are clusters 115a to 115d before the compression. The clusters 115a to 115d before the compression have the same size.

The compression and decompression unit 14 executes the compression process with respect to the clusters 115a to 115d. As a result, it is assumed that the sizes of the clusters 115b and 115d are reduced, and the clusters 115a and 115c are uncompressed.

In this case, the CPU 12 executes the first arrangement process of arranging the uncompressed clusters 115a and 115c in the ECC frames 120a and 120b on the head side of the layout area among the plurality of ECC frames 120. Then, the CPU 12 executes a second arrangement process of arranging the clusters 115b and 115d in the ECC frames 120d and 120c on the end side of the layout area.

In this way, when a cluster 115 to be processed is an uncompressed cluster, the CPU 12 arranges the cluster 115 in a ECC frame 120 on the head side of the layout area indicated by a predetermined write pointer. Then, when a cluster 115 to be processed is a compressed cluster, the CPU 12 arranges the cluster 115 to be continuous in the ECC frame 120 on the end side of the layout area indicated by a different write pointer.

Figure 5:
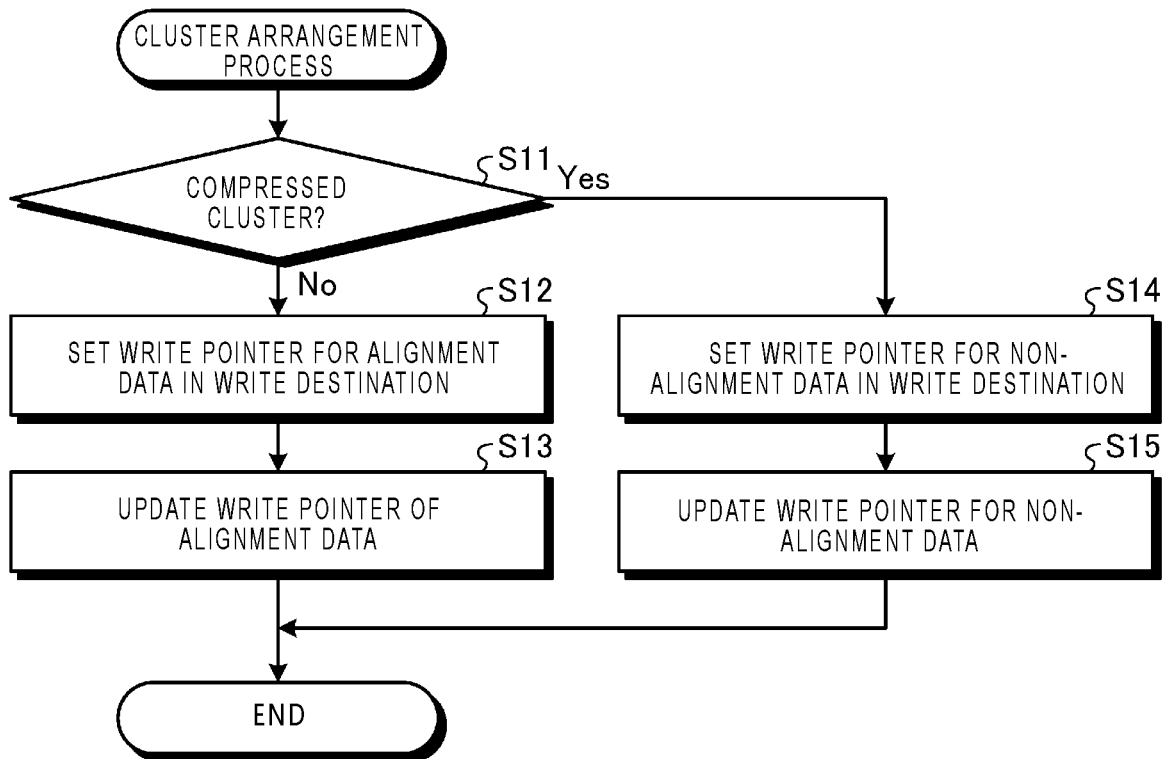
FIG. 5 is a flowchart illustrating a procedure for a cluster arrangement process performed by a memory system according to the second embodiment.

Subsequently, the process procedure for the cluster arrangement process executed by the CPU 12 will be described with reference to FIG. 5. FIG. 5 is a flowchart illustrating the process procedure for the cluster arrangement process performed by the memory system 1 according to the second embodiment.

The CPU 12 determines whether a cluster 115 to be arranged is a compressed cluster (step S11). When it is determined that the cluster 115 to be arranged is not a compressed cluster (step S11: No), the CPU 12 refers to a write pointer for aligned data (step S12). Then, the CPU 12 arranges the cluster (i.e., uncompressed cluster) 115 to a position indicated by the write pointer for aligned data and updates the write pointer to the end of the cluster 115 (step S13).

Meanwhile, when the CPU 12 determines that the cluster 115 to be arranged is a compressed cluster (step S11: Yes), the CPU 12 refers to a write pointer for non-aligned data (step S14). Then, the CPU 12 arranges the cluster (i.e., compressed cluster) 115 to a position indicated by the write pointer for non-aligned data and updates the write pointer to the end of the cluster 115 (step S15).

In the example described above, the memory controller 10 switches the write pointer to be referred to according to whether the cluster 115 to be arranged is compressed. However, according to this arrangement rule, clusters of which logical addresses are adjacent to each other may be arranged in different pages of the NAND memory 20. To address this issue, the following arrangement rules may be added. For example, when uncompressed clusters are continuous, the memory controller 10 may set the corresponding clusters 115 in the ECC frames 120 on the head side. This rule aims to ensure that clusters of which logical addresses are close to each other are arranged in the same page of the NAND memory 20. For example, when only one uncompressed cluster is present in the middle of continuous compressed clusters, it may be better to avoid access to separate pages of the NAND memory 20 in order to access the uncompressed cluster, rather than reducing clusters extending over the boundary of ECC frames. As a result, the memory controller 10 may avoid a situation where the uncompressed cluster 115 is arranged in areas distant from the compressed clusters, which results in an increased read process load.

Alternatively, the CPU 12 may align clusters 115 when the logical addresses of the clusters 115 are discontinuous. When the logical addresses of the clusters 115 are discontinuous, the clusters 115 are highly likely to be read at random. Meanwhile, when a write process is performed with respect to clusters of which logical addresses are continuous, a subsequent read process with respect to these clusters 115 is highly likely to be sequential, and thus, the merit of aligning the clusters 115 in the ECC frames 120 is low. The CPU 12 may align the arrangement locations of the clusters 115 only when the logical addresses of clusters 115 are discontinuous, thereby avoiding a read process from being executed across multiple ECC frames 120 when the clusters 115 are highly likely to be read at random.

As described above, the memory controller 10 executes the compression process for the clusters 115 that are generated from the user data acquired from the host 2, and then, performs the arrangement of the clusters 115. The memory controller 10 performs the arrangement by either the arrangement process of arranging uncompressed clusters to correspond to the ECC frames 120, respectively, and the arrangement process of arranging compressed clusters separately from the uncompressed clusters.

In this case, the memory controller 10 may align the uncompressed clusters 115 to correspond to the ECC frames 120, and may reduce the number of clusters 115 extending over multiple ECC frames 120.

Third Embodiment

A memory system 1 according to a third embodiment controls arrangement of clusters 115 during a copy process of a garbage collection, to change the arrangement of the clusters 115. The memory system 1 performs such a control by selecting an arrangement process of arranging uncompressed clusters 115 to correspond to ECC frames 120, respectively, and an arrangement process of arranging compressed clusters 115 separately from the uncompressed clusters 115, so as to reduce the number of clusters 115 extending over the boundary of the ECC frames 120.

Figures 6A, 6B, 6C:
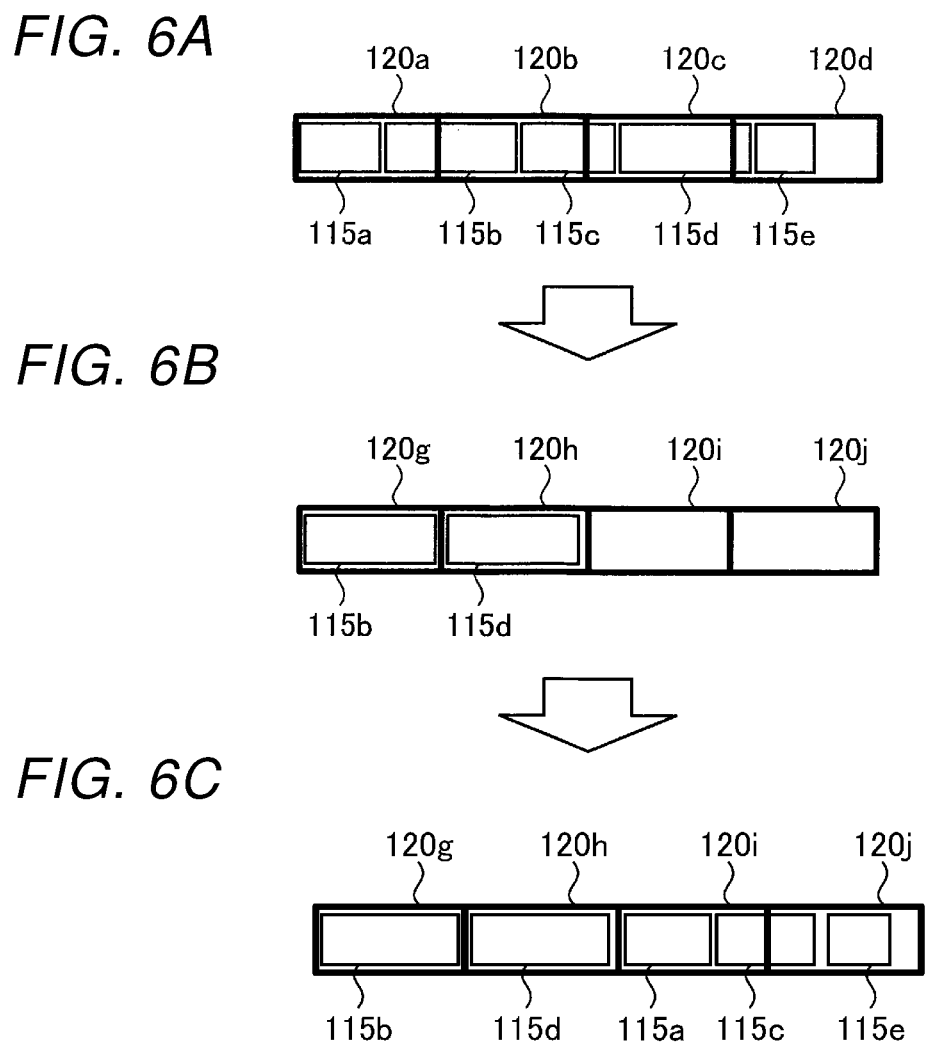

The process of the garbage collection in the third embodiment will be described with reference to FIGS. 6A to 6C. FIG. 6A is a diagram illustrating clusters 115 arranged in the ECC frames 120 before the garbage collection is executed. The clusters 115a, 115c, and 115e are compressed clusters. The clusters 115b and 115d are uncompressed clusters. The cluster 115a is arranged in the ECC frame 120a. The cluster 115b is arranged in the ECC frames 120a and 120b. The cluster 115c is arranged in the ECC frames 120b and 120c. The cluster 115d is arranged in the ECC frames 120c and 120d. The cluster 115e is arranged in the ECC frame 120d.

In this case, as illustrated in FIG. 6B, the CPU 12 arranges the uncompressed clusters 115b and 115d in ECC frames 120g and 120h as the copy destinations of the garbage collection.

Subsequently, as illustrated in FIG. 6C, the CPU 12 arranges the compressed clusters 115a, 115c, and 115e in an ECC frame 120i or 120j.

In this way, the CPU 12 collectively arranges the uncompressed clusters 115 in the ECC frames 120, and collectively arranges the compressed clusters 115 in the subsequent ECC frames 120. As a result, the number of clusters extending over the ECC frame 120 may be reduced, as compared with a case where the uncompressed clusters and the compressed clusters are arranged in the ECC frames 120 in a mixed manner.

Figure 7:
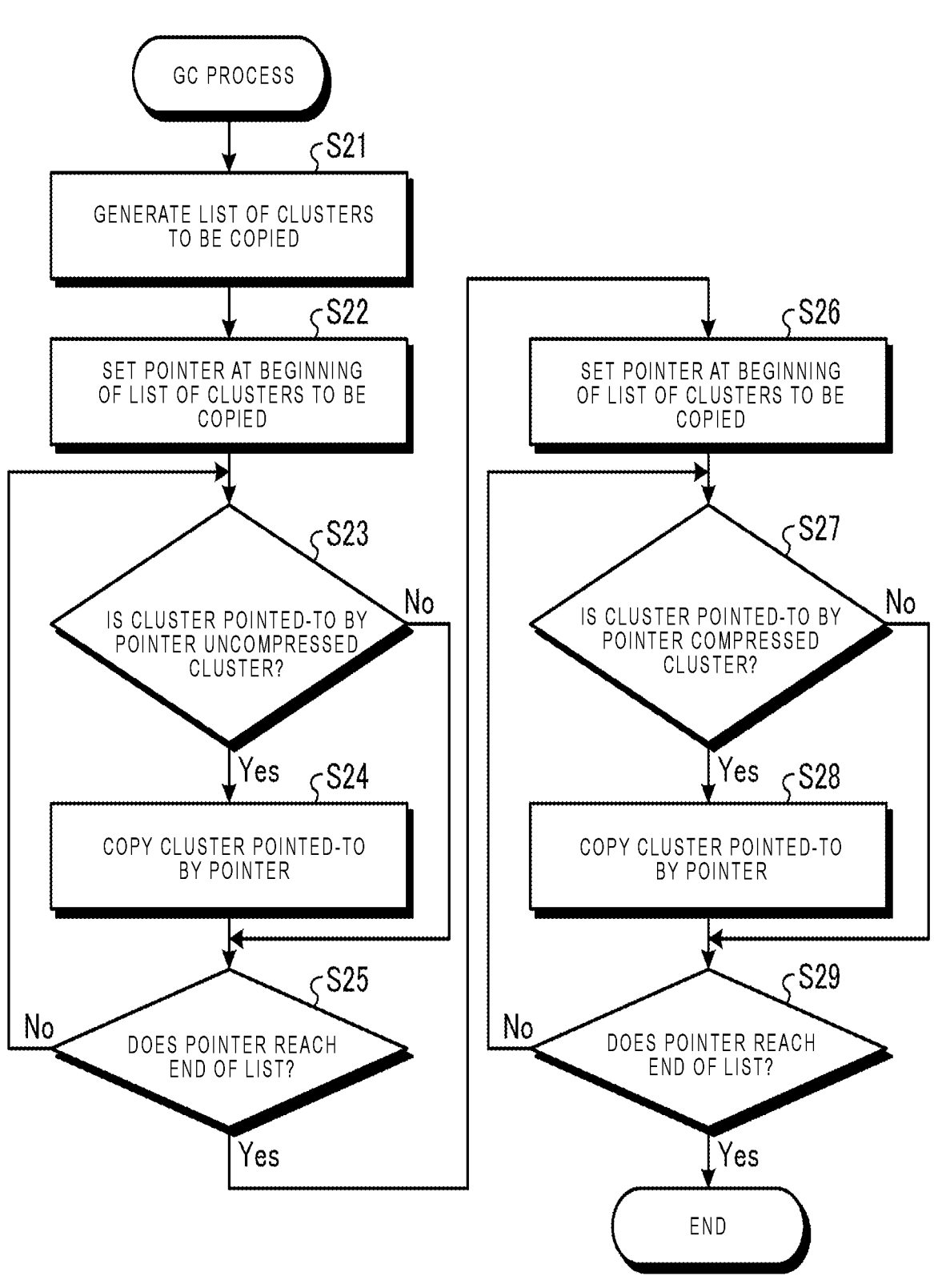
FIG. 7 is a flowchart illustrating a procedure for a cluster arrangement process performed by a memory system according to the third embodiment.

Subsequently, a process procedure for the cluster arrangement process executed by the CPU 12 according to the third embodiment will be described with reference to FIG. 7. FIG. 7 is a flowchart illustrating the process procedure for the cluster arrangement process performed by the memory system 1 according to the third embodiment.

The CPU 12 extracts clusters 115 arranged in ECC frames 120 stored in the NAND memory 20, which is the copy source of the garbage collection, and generates a list of the clusters 115 to be copied (step S21). The CPU 12 sets a pointer at the beginning of the list of the clusters 115 to be copied (step S22). When it is determined that a cluster 115 pointed by the pointer is an uncompressed cluster (step S23: Yes), the cluster 115 pointed by the pointer is arranged in a ECC frame 120 of the copy destination (step S24). When it is determined that the pointer does not reach the end of the list (step S25: No), the pointer points to the next cluster 115, and the process proceeds to step S23.

When it is determined in step S25 that the pointer reaches the end of the list, the CPU 12 sets the pointer at the beginning of the list of the clusters to be copied (step S26). When it is determined that the cluster 115 pointed by the pointer is a compressed cluster (step S27: Yes), the cluster 115 pointed by the pointer is arranged in an ECC frame 120 of the copy destination (step S28). When it is determined that the pointer does not reach the end of the list (step S29: No), the pointer points to the next cluster 115, and the process proceeds to step S27. When it is determined that the pointer reaches the end of the list (step S29: Yes), the process ends.

Meanwhile, in the example above, descriptions have been made on a case where the arrangement location of a cluster 115 to be copied is changed according to whether the cluster 115 is compressed. However, according to this arrangement rule, clusters having adjacent logical addresses may be arranged in different pages of the NAND memory 20. To address such an issue, instead of the process procedure illustrated in FIG. 7, the following process may be executed. For example, when uncompressed clusters are continuously present, the continuous uncompressed clusters may be first copied to the ECC frames of the copy destinations, and then, the remaining clusters may be copied to the ECC frames of the copy destinations. This condition aims to arrange the clusters of which logical addresses are close to each other, in the same page of the NAND memory 20 if possible. For example, when only one uncompressed cluster is present in the middle of continuous compressed clusters, it may be better to avoid access to separate pages of the NAND memory 20 in order to access the uncompressed cluster, rather than reducing clusters extending over the boundary of ECC frames. As a result, the memory controller 10 may avoid a situation where an uncompressed cluster 115 is arranged in areas distant from the compressed clusters, which results in an increased read process load.

Alternatively, when logical addresses of some clusters are discontinuous, the CPU 12 may first arrange the clusters having the discontinuous logical addresses in the ECC frames of the copy destinations, and then, align each cluster. When the logical addresses of clusters are discontinuous, these clusters are highly likely to be read at random. Meanwhile, when a write process is performed with respect to clusters with continuous logical addresses, the subsequent read process with respect to these clusters is highly likely to be sequential, and thus, the merit of aligning the clusters in the ECC frames 120 is low. The CPU 12 may perform the alignment only when the logical addresses of clusters 115 are discontinuous, thereby avoiding a read process from being executed across multiple ECC frames 120 when the clusters are highly likely to be read at random.

As described above, the memory controller 10 changes the arrangement location of the cluster 115 in the area subjected to the garbage collection, to the arrangement location of the copy destination area. The memory controller 10 performs the arrangement by either the arrangement process of arranging uncompressed clusters to correspond to the ECC frames 120, respectively, and the arrangement process of arranging compressed clusters separately from the uncompressed clusters.

In this case, the memory controller 10 may align the uncompressed clusters 115 to corresponding to the ECC frames 120, and may reduce the number of clusters 115 extending over multiple ECC frames 120.

Fourth Embodiment

A memory system 1 according to a fourth embodiment prepares a plurality of types of ECC frames 120, and arranges clusters 115 according to the compression result of the clusters 115, so as to reduce the number of clusters 115 extending over multiple ECC frames 120.

The method of arranging the clusters 115 according to the fourth embodiment will be described with reference to FIG. 8. In the memory system 1 according to the fourth embodiment, it is assumed that there are clusters 115a to 115g after the compression process and before the arrangement. The sizes of the compressed clusters 115 may be quantized by appropriately adding padding areas to the compressed clusters 115 such that the size of each compressed cluster 115 becomes $\frac{1}{2}^n$ of the original size.

Specifically, each of the clusters 115a, 115d, 115e, and 115g is compressed to $\frac{1}{4}$. Meanwhile, each of the clusters 115a, 115d, 115e, and 115g may be compressed to $\frac{1}{4}$ by compressing the cluster to a size smaller than $\frac{1}{4}$, and adding a padding area. Further, each of the clusters 115b and 115f is compressed to $\frac{1}{2}$. Meanwhile, each of the clusters 115b and 115f may be compressed to $\frac{1}{2}$ by compressing the cluster to a size larger than $\frac{1}{4}$ and smaller than $\frac{1}{2}$, and adding a padding area. The cluster 115c is an uncompressed cluster.

The CPU 12 arranges the clusters 115a, 115d, 115e, and 115g in the ECC frame 120a for the $\frac{1}{4}$ size. Then, the CPU 12 arranges the clusters 115b and 115f in the ECC frame 120b for the $\frac{1}{2}$ size. Then, the CPU 12 arranges the cluster 115c in the ECC frame 120c for the equal size.

In this case, not only the uncompressed cluster but also the compressed clusters may be prevented from being arranged across the boundary of the ECC frames 120.

Figure 8:
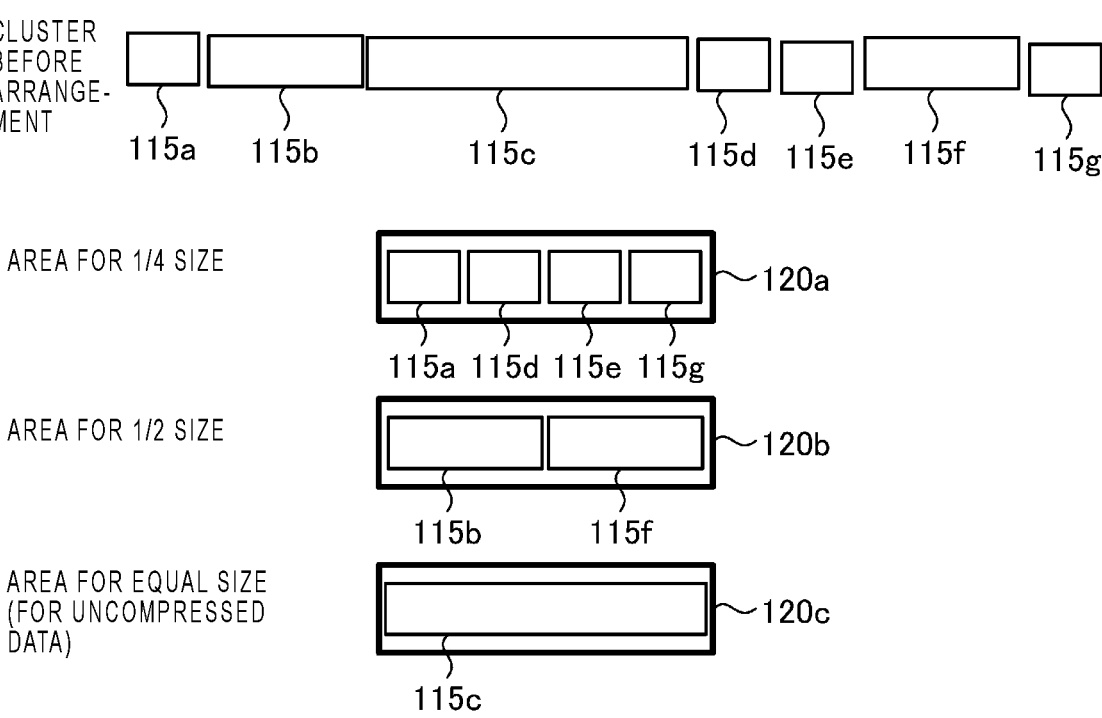
FIG. 8 is a diagram illustrating an example of cluster arrangement according to a fourth embodiment.

Meanwhile, the memory controller 10 may set the areas for the respective sizes illustrated in FIG. 8, in the copy destination area during the garbage collection. In this case, the arrangement location of the copy destination of a compressed cluster 115 in an area subjected to the garbage collection can be determined based on the size of the compressed cluster 115.

As described above, the memory controller 10 may set the plurality of areas based on the data sizes of the clusters after the compression process, and determine the arrangement locations of the clusters based on the data sizes of the clusters after the compression process, thereby reducing the possibility that clusters are arranged across multiple ECC frames 120.

In the memory system 1 according to each of the embodiments described above, the alignment is executed in accordance with the ECC frame, which is the unit of the error correction process. However, the present disclosure is not limited thereto. For example, when the memory controller 10 has a function to cache data read from a physical element, each line (i.e., entry) of the cache is aligned in a fixed size, and one compressed cluster may be present across multiple lines of the cache. Thus, the memory controller 10 may perform the alignment based on a corresponding line, instead of the ECC frame.

While certain embodiments have been described, these embodiments have been presented by way of example only, and are not intended to limit the scope of the disclosure. Indeed, the novel embodiments described herein may be embodied in a variety of other forms; furthermore, various omissions, substitutions, and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:

a nonvolatile memory; and a controller configured to:

segment data to be stored in the nonvolatile memory into a plurality of clusters;

perform a compression with respect to each of the clusters;

allocate the clusters subjected to the compression to a plurality of error-correcting encoding frames in accordance with a first predetermined rule, wherein according to the first predetermined rule, at least a part of a compressed cluster is allocated to a vacant space of an error-correcting encoding frame in a first state, which is an error-correcting encoding frame to which another compressed cluster has been allocated, when a logical address of the compressed cluster or the vacant space of the error-correcting encoding frame in the first state satisfies a predetermined condition, and an entirety of a compressed cluster is allocated to an error-correcting encoding frame in a second state, which is an error-correcting encoding frame to which no other compressed cluster has been allocated, when no error-correcting encoding frame in the first state exists or when the logical address of the compressed cluster or the vacant space of the error-correcting encoding frame in the first state does not satisfy the predetermined condition;

error-correcting encode data in each of the error-correcting encoding frames; and write the error-correcting encoded data into the nonvolatile memory, wherein the predetermined condition is satisfied when the vacant space of the error-correcting encoding frame in the first state is greater than a predetermined size.

2. The memory system according to claim 1, wherein according to the first predetermined rule, when an entirety of a compressed cluster is allocated to an error-correcting encoding frame in the second state, the compressed cluster is allocated from a head position of the error-correcting encoding frame.

3. The memory system according to claim 1, wherein a size of each of the clusters before the compression equals a size of the error-correcting encoding frame.

4. The memory system according to claim 1, wherein the controller is further configured to allocate padding data to the vacant space of the error-correcting encoding frame in the first state when none of the compressed clusters is allocated thereto.

5. The memory system according to claim 1, wherein the compressed cluster of which part is allocated to the vacant space of the error-correcting encoding frame in the first state includes another part allocated to the error-correcting encoding frame in the second state, when a size of the compressed cluster is greater than the size of the vacant space.

6. The memory system according to claim 1, wherein the predetermined condition is not satisfied when the logical address of the compressed cluster to be allocated is not continuous from a logical address of a previous compressed cluster that has been allocated immediately before the compressed cluster.

7. The memory system according to claim 1, wherein the controller is configured to allocate the compressed clusters also in accordance with a second predetermined rule, according to which an entirety of a compressed cluster is allocated to the error-correcting encoding frame in the second state when the compressed cluster is unchanged in size by the compression.

8. The memory system according to claim 7, wherein according to the first and second predetermined rules, at least a part of a compressed cluster is allocated to the vacant space of the error-correcting encoding frame in the first state when the vacant space is greater than the predetermined size and the size of the compressed cluster is reduced by the compression.

9. The memory system according to claim 7, wherein the controller is configured to allocate the compressed clusters also in accordance with a third predetermined rule, according to which compressed clusters that have been unchanged in size by the compression are collectively allocated to a first group of the error-correcting encoding frames and compressed clusters that have been reduced in size by the compression are collectively allocated to a second group of the error-correcting encoding frames.

10. The memory system according to claim 9, wherein a size of each of the clusters before the compression equals a size of the error-correcting encoding frame, and according to the third predetermined rule, each compressed cluster of which size have been unchanged by the compression is allocated to one, and not more than two, error-correcting encoding frame.

* * * * *